(12) United States Patent
Wei et al.

(10) Patent No.: US 9,280,284 B2
(45) Date of Patent: Mar. 8, 2016

(54) METHOD, APPARATUS AND COMPUTER READABLE MEDIUM FOR POLYGON GESTURE DETECTION AND INTERACTION

(71) Applicant: Wistron Corporation, New Taipei (TW)

(72) Inventors: Shou-Te Wei, New Taipei (TW); Sheng-Hua Chou, New Taipei (TW); Shang-Chin Su, New Taipei (TW)

(73) Assignee: Wistron Corporation, New Taipei (TW)

( * ) Notice: Subject to any disclaimer, the term of this patent is extended or adjusted under 35 U.S.C. 154(b) by 216 days.

(21) Appl. No.: 14/243,893

(22) Filed: Apr. 3, 2014

(65) Prior Publication Data

US 2015/0169072 A1 Jun. 18, 2015

(30) Foreign Application Priority Data

Dec. 16, 2013 (TW) .............................. 102146458 A

(51) Int. Cl.
G06F 3/0488 (2013.01)
G06F 3/0484 (2013.01)

(52) U.S. Cl.
CPC ........ G06F 3/04883 (2013.01); G06F 3/04842 (2013.01)

(58) Field of Classification Search
None
See application file for complete search history.

(56) References Cited

U.S. PATENT DOCUMENTS

| | | | | |
|---|---|---|---|---|
| 5,121,442 A * | 6/1992 | Togawa | ................... | G06F 3/033 345/156 |
| 5,598,187 A * | 1/1997 | Ide | ....................... | G06F 3/0346 345/156 |
| 6,233,351 B1 * | 5/2001 | Feeney | ............... | G06K 9/00416 345/522 |
| 6,577,758 B1 * | 6/2003 | Kawata | ................ | G06K 9/3233 382/151 |
| 6,714,679 B1 * | 3/2004 | Scola | ........................ | G06K 9/48 345/442 |
| 8,229,222 B1 * | 7/2012 | Silver | ..................... | G06K 9/481 382/141 |
| 8,847,904 B2 | 9/2014 | Chang et al. | | |
| 8,887,102 B2 * | 11/2014 | Fu | ........................ | G06F 3/04883 345/173 |
| 2010/0027892 A1 * | 2/2010 | Guan | ................. | G06K 9/00355 382/203 |
| 2010/0033352 A1 * | 2/2010 | Chuang | ................. | G06F 3/0346 341/20 |
| 2013/0141326 A1 * | 6/2013 | Liou | ....................... | G06F 3/017 345/156 |
| 2013/0162573 A1 | 6/2013 | Huang | | |
| 2014/0082570 A1 * | 3/2014 | Chung | ................. | G06F 3/0488 715/863 |

FOREIGN PATENT DOCUMENTS

| | | |
|---|---|---|
| TW | 201305878 | 2/2013 |
| TW | 201324236 | 6/2013 |
| TW | 201327332 | 7/2013 |

OTHER PUBLICATIONS

"Office Action of Taiwan Counterpart Application" with English translation, issued on Oct. 5, 2015, p. 1-p. 34, in which the listed references (foreign patent No. 1-3) were cited.

* cited by examiner

Primary Examiner — Antonio Xavier
(74) Attorney, Agent, or Firm — Jianq Chyun IP Office

(57) ABSTRACT

A method, an apparatus, and a computer readable medium for polygon gesture detection and interaction, adapted to an electronic apparatus having an input unit, are provided. In the method, a gesture moving from a starting point to an end point is received by using the input unit and sampling points thereof are collected. A trajectory of the sampling points is analyzed to obtain a center of the gesture. A surrounding area of the center is divided into equal label areas. A distance and an angle relative to an origin of each sampling point in the label areas are calculated and used as a vertical axis and a horizontal axis to draw a waveform diagram. A shape formed by the trajectory is determined according to characteristics of the waveform diagram and a specific function corresponding to the shape is performed.

15 Claims, 6 Drawing Sheets

METHOD, APPARATUS AND COMPUTER READABLE MEDIUM FOR POLYGON GESTURE DETECTION AND INTERACTION

CROSS-REFERENCE TO RELATED APPLICATION

This application claims the priority benefit of Taiwan application serial no. 102146458, filed on Dec. 16, 2013. The entirety of the above-mentioned patent application is hereby incorporated by reference herein and made a part of this specification.

BACKGROUND OF THE INVENTION

1. Field of the Invention

The invention relates a method and an apparatus for gesture detection, and more particularly to a method, an apparatus, and a computer readable medium for detecting polygon gesture and performing interactions thereto.

2. Description of Related Art

In recent years, computer apparatuses with various functions are getting popular each day in terms of working environments as well as everyday life. With powerful communication and computation capabilities provided by the computer apparatuses, people may quickly gather information and take care of complex tasks for improving convenience in lifestyles.

Generally, users are used to issue commands by using buttons or keyboards as an interface, so as to operate the computing apparatuses to execute specific functions. However, with advancement in interactive display technologies, an operating method using gestures has been widely applied as a replacement to the buttons or the keyboards for operating the computing apparatuses. In other words, a user message that a human-machine interface may receive is no longer limited to the commands generated by the buttons and the keyboard. Many human-machine interfaces supporting controls by the gestures are gradually favored by the users since a human-to-machine interaction thereof may be more user friendly.

In the existing gestures, a received gesture is compared with a gesture model in a database being established in advance, so that the gesture model that matches the comparison may be selected as an input. Nevertheless, the existing gestures are limited only in dragging with one finger or multiple fingers towards different directions. Therefore, it is required to design more gestures for improving diversity of interaction between the user and the apparatus.

SUMMARY OF THE INVENTION

Accordingly, the invention provides a method, an apparatus, and a computer readable medium for polygon gesture detection and interaction, capable of detecting polygon gesture for improving diversity of interaction between the user and the apparatus.

A method for polygon gesture detection and interaction of the invention is adapted to an electronic apparatus having an input unit. In the method, a gesture moving from a starting point to an end point is received by using the input unit and sampling points thereof are collected. A trajectory of the sampling points is analyzed to obtain a center of the gesture. A surrounding area of the center is divided into equal label areas. A distance and an angle relative to an origin of each sampling point in the label areas are calculated and used as a vertical axis and a horizontal axis to draw a waveform diagram. A shape formed by the trajectory is determined according to characteristics of the waveform diagram and a specific function corresponding to the shape is executed.

In an embodiment of the invention, the step of analyzing the trajectory of the sampling points to obtain the center of the gesture includes: calculating a center of the trajectory to be used as the center of the gesture according to a coordinate of each of the sampling points.

In an embodiment of the invention, the electronic apparatus further includes a display unit, and the step of analyzing the trajectory of the sampling points to obtain the center of the gesture includes: deciding an object covered by a circled area of the trajectory of the sampling points on a frame of the display unit; determining whether a proportion of an area of the object occupied by the circled area is greater than a threshold; and using a center position of the object as the center when the proportion is greater than the threshold.

In an embodiment of the invention, the step of performing the specific function corresponding to the shape includes: performing the specific function corresponding to the shape on the object according to the shape formed by the trajectory.

In an embodiment of the invention, after the step of dividing, by using the center as the origin, the surrounding area of the origin into the equal label areas, the method further checks whether the starting point and the end point are in the same label area, and considers that the gesture is invalid when the starting point and the end point are not in the same label area.

In an embodiment of the invention, the step of determining the shape formed by the trajectory according to the characteristic of the waveform diagram includes: determining the shape formed by the trajectory according to a number of peaks or troughs existed in the waveform diagram.

In an embodiment of the invention, the step of determining the shape formed by the trajectory according to the characteristic of the waveform diagram includes: determining the shape formed by the trajectory according to peak values of peaks existed in the waveform diagram and a proportional relation between sizes of the peak values.

The invention further provides an apparatus for polygon gesture detection and interaction, which includes an input unit, a storage unit and a processing unit. Therein, the input unit is configured to receive a gesture, the storage unit is configured to record a plurality of modules, and the processing unit is coupled to the input unit and the storage unit, and configured to access and execute the modules recorded in the storage unit. The modules include a gesture receiving module, a center obtaining module, an area dividing module, a calculation module and a determining module. The gesture receiving module is configured to receive a gesture moving from a starting point to an end point by the input unit and collect a plurality of sampling points from the starting point to the end point. The center obtaining module is configured to analyze a trajectory of the sampling points to obtain a center of the gesture. The area dividing module is configured to divide, by using the center as an origin, a surrounding area of the origin into a plurality of equal label areas. The calculation module is configured to calculate a distance and an angle relative to the origin of each of the sampling points in the label areas, and draw a waveform diagram by using the distance as a vertical axis and using the angle as a horizontal axis. The determining module is configured to determine a shape formed by the trajectory according to characteristics of the waveform diagram, and perform a specific function corresponding to the shape.

In an embodiment of the invention, the center obtaining module calculates a center of the trajectory to be used as the center of the gesture according to a coordinate of each of the sampling points.

In an embodiment of the invention, the apparatus for polygon gesture detection and interaction further includes a display unit, and the center obtaining module decides an object covered by a circled area of the trajectory of the sampling points on a frame of the display unit, determines whether a proportion of an area of the object occupied by the circled area is greater than a threshold, and uses a center position of the object as the center when the proportion is greater than the threshold.

In an embodiment of the invention, the determining module performs the specific function corresponding to the shape on the object according to the shape formed by the trajectory.

In an embodiment of the invention, the gesture receiving module checks whether the starting point and the end point are in the same label area, and considers that the gesture is invalid when the starting point and the end point are not in the same label area.

In an embodiment of the invention, the determining module determines the shape formed by the trajectory according to a number of peaks or troughs existed in the waveform diagram.

In an embodiment of the invention, the determining module determines the shape formed by the trajectory according to peak values of peaks existed in the waveform diagram and a proportional relation between sizes of the peak values.

A non-transitory computer readable medium of the invention loads programs through an electronic apparatus to perform steps of: receiving a gesture moving from a starting point to an end point by an input unit of the electronic apparatus and collecting a plurality of sampling points from the starting point to the end point; analyzing a trajectory of the sampling points to obtain a center of the gesture; dividing, by using the center as an origin, a surrounding area of the origin into a plurality of equal label areas; calculating a distance and an angle relative to the origin of each of the sampling points in the label areas, and drawing a waveform diagram by using the distance as a vertical axis and using the angle as a horizontal axis; and determining a shape formed by the trajectory according to at least one characteristic of the waveform diagram, and performing a specific function corresponding to the shape.

Based on above, in the method, the apparatus, and the computer readable medium for polygon gesture detection and interaction of the invention, the center of the gesture may be obtained by analyzing the trajectory of the gesture, and the shape of the gesture may be determined according to the positional relation between each sampling point of the gesture and the center, so as to achieve the purpose of determining polygon gesture. Moreover, the invention may assign the detected polygon gesture to the specific function of the apparatus for providing interaction between the user and the apparatus, such that the diversity of interaction between the user and the apparatus may be improved.

To make the above features and advantages of the disclosure more comprehensible, several embodiments accompanied with drawings are described in detail as follows.

DESCRIPTION OF THE EMBODIMENTS

In view of a positional relation between a plurality of sampling points and a center on each of sides of a polygon, it can be found that a distance between an endpoint on the side and the center is relatively longer, whereas a distance between any sampling point on the side and the center is relatively shorter. When the sampling point is farther away from the endpoint, a distance between such sampling point and the center is shorter. Accordingly, in the invention, a trajectory of the gesture is analyzed, so that a shape of the gesture may be determined through distance variations between the sampling points and the center on the trajectory. Further, based on the trajectory of the gesture, the invention may further determine a screen object that a user intends to operate, such that a center of the object may be used a reference for determining the shape of the gesture. Accordingly, the invention is capable of detecting any polygon gesture performed by the user and accordingly performing a specific function, such that the diversity of interaction between the user and the apparatus may be improved.

Figure 1:
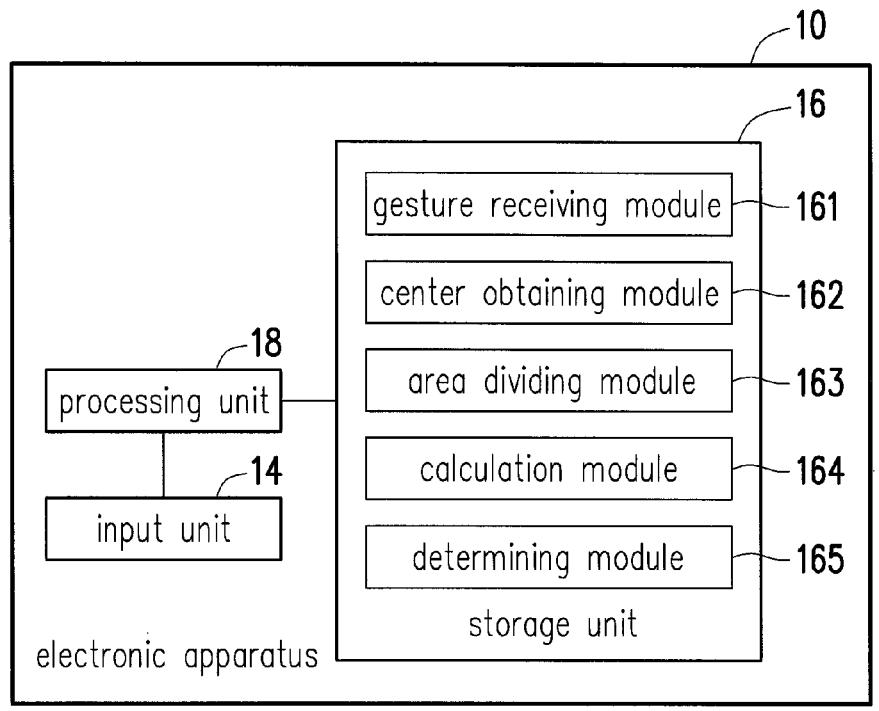
FIG. 1 is a block diagram illustrating an apparatus for polygon gesture detection and interaction according to an embodiment of the invention.

FIG. 1 is a block diagram illustrating an apparatus for polygon gesture detection and interaction according to an embodiment of the invention. Referring to FIG. 1, an electronic apparatus 10 of the embodiment is, for example, a personal computer, a smart phone, a personal digital assistant (PDA), a PDA phone, a notebook computer, a tablet computer or a smart television, which includes an input unit 14, a storage unit 16 and one or more processing units 18. Details are illustrated below.

The input unit 14 is, for example, a mouse, a touchpad, or a touch panel having a touch sensing element of resistive type, capacitive type, or other types, or, an apparatus capable of capturing images such as a lens which is used for receiving the gesture of the user.

The storage unit 16 is, for example, any forms of fixed or movable random access memory (RAM), read only memory (ROM), flash memory, hard disk or other similar devices, or a combination of above-said devices, so as to record modules to be executed by the processing unit 18. Said modules may be loaded into the processing units 18 for performing functions for polygon gesture detection and interaction.

The processing unit 18 is, for example, a central processing unit (CPU) or other programmable devices for general purpose or special purpose such as a microprocessor, a digital signal processor (DSP), a programmable controller, an application specific integrated circuit (ASIC), a programmable logic device (PLD) or other similar devices or a combination of above-mentioned devices. The processing unit 18 is coupled to the input unit 14 and the storage unit 16, respectively, and configured to access and execute the modules recorded in the storage unit 16 to realize the functions for polygon gesture detection and interaction.

The modules includes a gesture receiving module 161, a center obtaining module 162, an area dividing module 163, a calculation module 164 and a determining module 165. The modules are, for example, computer programs to be loaded by the processing unit 18 to perform the functions for polygon gesture detection and interaction. Detailed steps of the electronic apparatus 10 performing the functions for polygon gesture detection and interaction are described in the following embodiment.

Figure 2:
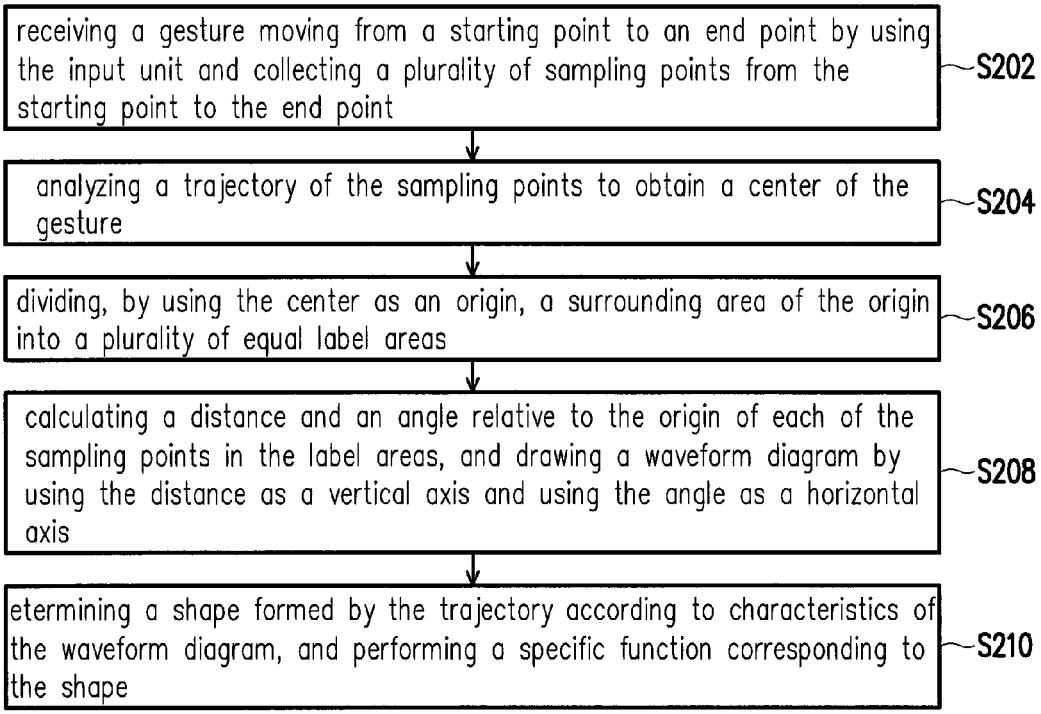
FIG. 2 is a flowchart illustrating a method for polygon gesture detection and interaction according to an embodiment of the invention.

FIG. 2 is a flowchart illustrating a method for polygon gesture detection and interaction according to an embodiment of the invention. Referring to FIG. 1 and FIG. 2 together, the method for polygon gesture detection and interaction of the present embodiment is adapted to the electronic apparatus 10 of FIG. 1. The following detailed steps are elaborated to describe the method for polygon gesture detection and interaction of the present embodiment with reference to each element of the electronic apparatus 10.

In step S202, the gesture receiving module 161 receives a gesture moving from a starting point to an end point by using the input unit 14 and collects a plurality of sampling points from the starting point to the end point while receiving the gesture. More specifically, in an embodiment, the input unit 14 is, for example, a gesture input device such as the mouse or the touchpad. When the gesture of the user is received by the input unit 14, the trajectory inputted by the user may be obtained. The gesture receiving module 161 may collect the sampling points to which the gesture passed through as a basis for determining a center of the gesture in subsequent steps. In another embodiment, the input unit 14 is, for example, the touch panel. When the gesture of the user is received by the input unit 14, a movement from a starting point to an end point is displayed on a display frame according to the gesture. The gesture receiving module 161 may then collect the sampling points to which the movement made through as the basis for determining the center of the gesture.

Next, in step S204, the center obtaining module 162 may analyze the trajectory of the sampling points collected by the gesture receiving module 161, so as to obtain the center of the gesture. For instance, the center obtaining module 162 may substitute a coordinate of each of the sampling points in the obtained sampling point information into the following equations.

$$\text{Area} = \frac{1}{2}\sum_{i=0}^{N-1}(x_i y_{i+1} - x_{i+1} y_i);$$

$$C_x = \frac{1}{6 \times \text{Area}}\sum_{i=0}^{N-1}(x_i + x_{i+1})(x_i y_{i+1} - x_{i+1} y_i);$$

$$C_y = \frac{1}{6 \times \text{Area}}\sum_{i=0}^{N-1}(y_i + y_{i+1})(x_i y_{i+1} - x_{i+1} y_i).$$

Therein, $(x_i, y_i)$ is the coordinate of each of the sampling points, and N is a number of the sampling points. After substituting them into the equation, the center obtaining module 162 may sequentially calculate a circled area (Area) of the sampling points and the coordinate $(C_x, C_y)$ of the center of the trajectory of the sampling points, and use the coordinate of the center as a center of a polygon gesture.

Next, in step S206, the area dividing module 163 may divide, by using the center as an origin, a surrounding area of the origin into a plurality of equal label areas. More specifically, the area diving module 163 may use the center of the gesture as the origin to divide the surrounding area of the origin into N label areas having equal areas, such as a label area 0 to a label area N−1, wherein a value of N is a natural number greater than 3.

Next, in step S208, the calculation module 164 calculates a distance and an angle relative to the origin of each of the sampling points in the label areas, and draws a waveform diagram for analysis by using the distance as a vertical axis and using the angle as a horizontal axis. More specifically, the calculation module 164 may calculate a distance between each of the sampling points in the N label areas being divided to have equal area and the center of the gesture as well as an angle of each of the sampling points relative to the center of the gesture, and then draw the waveform diagram by using the distance as the vertical axis and using the angle as the horizontal axis. The waveform diagram may show variations of the distance and the angle of each of the sampling points of the gesture to be used for analyzing a shape formed by the gesture.

Lastly, in step S210, the determining module 165 may determine the shape formed by the trajectory according to characteristics of the waveform diagram, and perform a specific function corresponding to the shape. More specifically, the determining module 165 may determine the shape of the polygon formed by the trajectory of the gesture according to a number of peaks or troughs existed in the waveform diagram based on the principle of "N vertices is included in a N-gon", and perform the specific function (e.g., activating a task management program, activating a network function, or changing an input mode, but the invention is not limited thereto) corresponding to the shape which is set in advance.

Figure 3A:
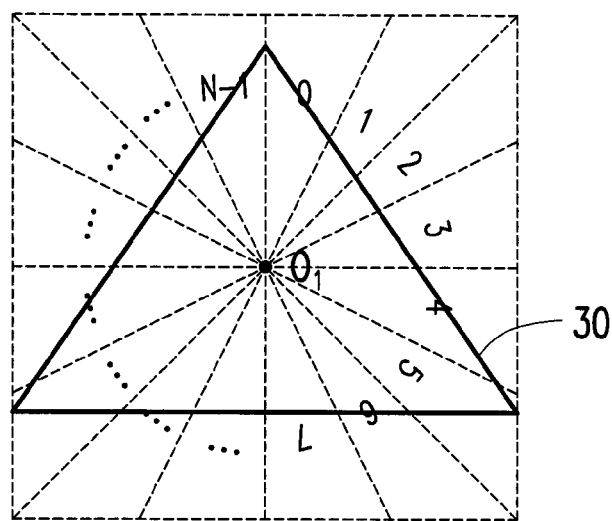
FIG. 3A and FIG. 3B illustrate an example of the method for polygon gesture detection and interaction according to an embodiment of the invention.
Figure 3B:
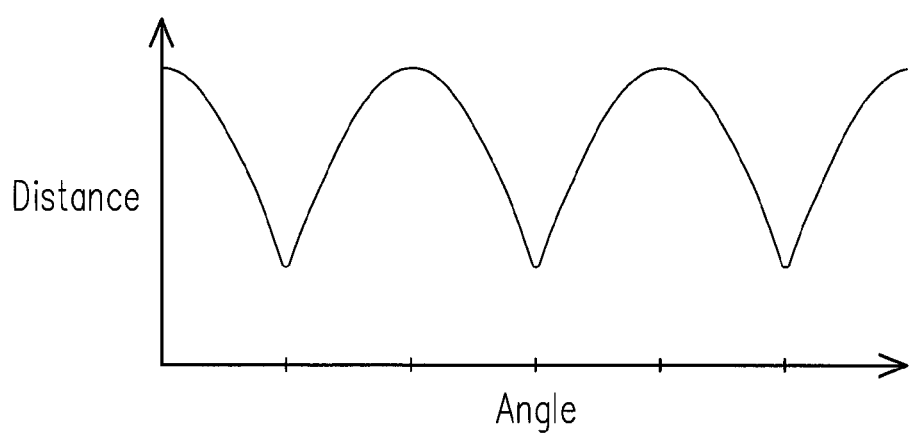

For instance, FIG. 3A and FIG. 3B illustrate an example of the method for polygon gesture detection and interaction according to an embodiment of the invention. Referring to FIG. 3A, in this example, the gesture receiving module 161 may receive a triangle gesture inputted by the user to the input unit 14, and collect the sampling points from the starting point to the end point in a trajectory 30 of said gesture. Next, after the center obtaining module 162 analyzes a center $O_1$ of the gesture through the collected sampling points, the area dividing module 163 may use the center $O_1$ of the gesture as an origin to divide a surrounding area thereof into equal label areas 0 to N−1. Thereafter, the calculation module 164 may calculate a distance and an angle relative to the origin of each of the sampling points in the label areas 0 to N−1, and draw a waveform diagram 32 as shown in FIG. 3B by using the distance as a vertical axis and using the angle as a horizontal axis. Referring to FIG. 3B, in the present embodiment, the determining module 165 determines that the shape formed by the trajectory 30 of the gesture is a triangle having three vertices according to three complete peaks and troughs which are obviously existed in the waveform diagram 32. Accordingly, the determining module 165 may perform the specific function corresponding to the triangle gesture set in advance.

Figure 4A:
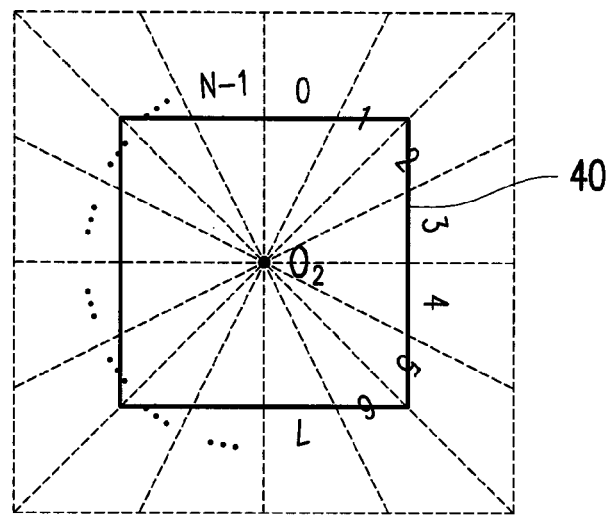
FIG. 4A and FIG. 4B illustrate an example of the method for polygon gesture detection and interaction according to an embodiment of the invention.
Figure 4B:
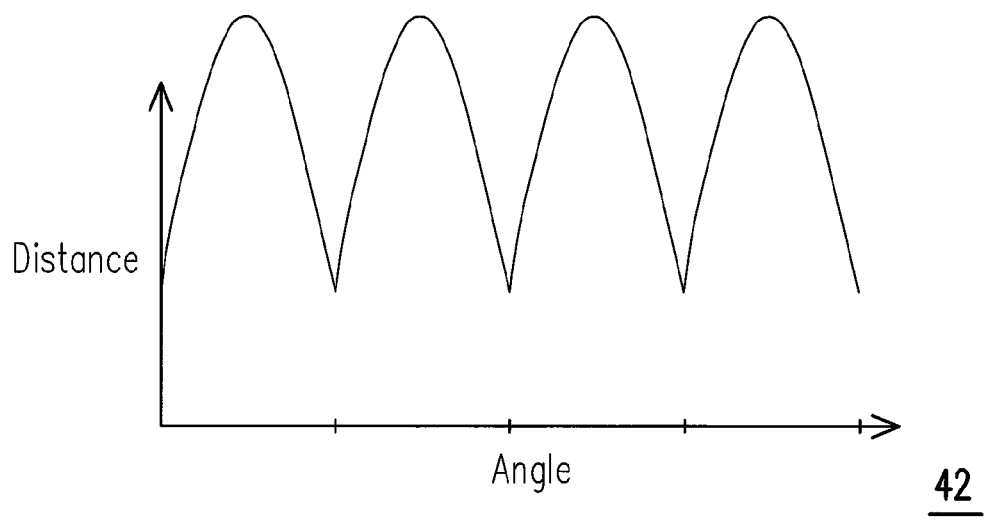

In another embodiment, FIG. 4A and FIG. 4B illustrate an example of the method for polygon gesture detection and interaction according to an embodiment of the invention. Referring to FIG. 4A, in this example, the gesture receiving module 161 may receive a rectangle gesture inputted by the user to the input unit 14, and collect a plurality of sampling points in a trajectory 40 of the gesture. Next, a waveform diagram 42 as shown in FIG. 4B is drawn by using the same method as that described in the foregoing embodiment. Referring to FIG. 4B, in the present embodiment, the determining module 165 determines that the shape formed by the trajectory 40 of the gesture is a rectangle having four vertices according to four complete peaks and troughs which are obviously existed in the waveform diagram 42. Accordingly, the determining module 165 may perform the specific function corresponding to the rectangle gesture set in advance.

Figure 5A:
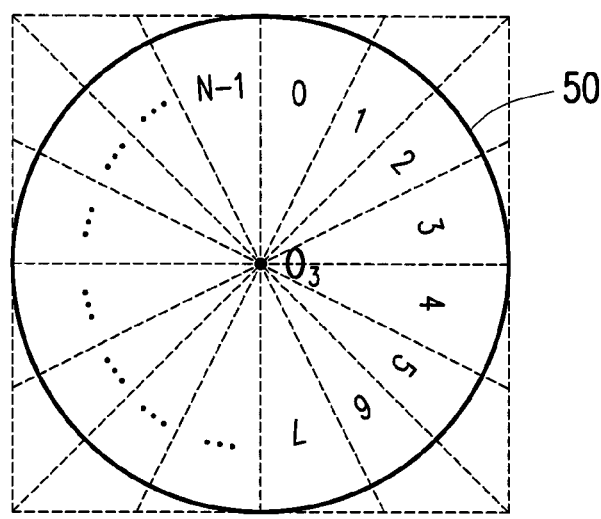
FIG. 5A and FIG. 5B illustrate an example of the method for polygon gesture detection and interaction according to an embodiment of the invention.
Figure 5B:
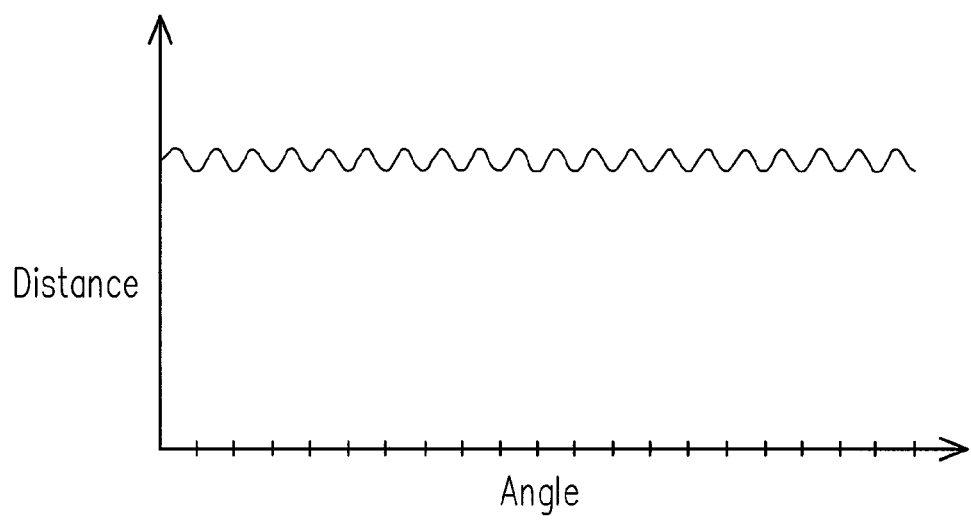

In another embodiment, FIG. 5A and FIG. 5B illustrate an example of the method for polygon gesture detection and interaction according to an embodiment of the invention. Referring to FIG. 5A, in this example, the gesture receiving module 161 may receive a circle gesture inputted by the user to the input unit 14, and collect a plurality of sampling points in a trajectory 50 of the gesture. Next, a waveform diagram 52 as shown in FIG. 5B is also drawn by using the same method as that described in the foregoing embodiment. Referring to FIG. 5B, in the present embodiment, the waveform diagram 52 includes a waveform approximate to a straight line yet having countless peaks or troughs. This indicates that the distance between each of the sampling points of the gesture and a center $O_3$ is substantially the same to one another. Therefore, the determining module 165 may determine that the shape formed by the trajectory 50 is a circle. Accordingly, the determining module 165 may perform the specific function corresponding to the circle gesture set in advance.

It should be noted that, other than determining the shape of the polygon formed by the trajectory of the gesture according to the number of peaks or troughs existed in the waveform diagram, the determining module 165 may also determine the shape formed by the trajectory of the gesture more specifically according to peak values of the peaks existed in the waveform diagram and a proportional relation between sizes of the peak values.

Figure 6A:
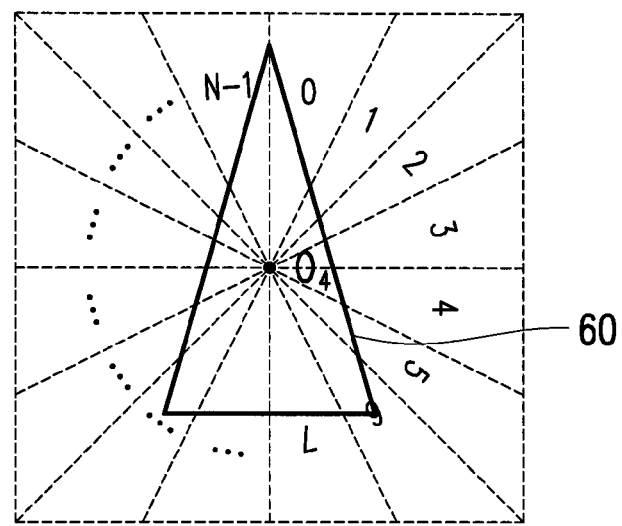
FIG. 6A and FIG. 6B illustrate an example of the method for polygon gesture detection and interaction according to an embodiment of the invention.
Figure 6B:
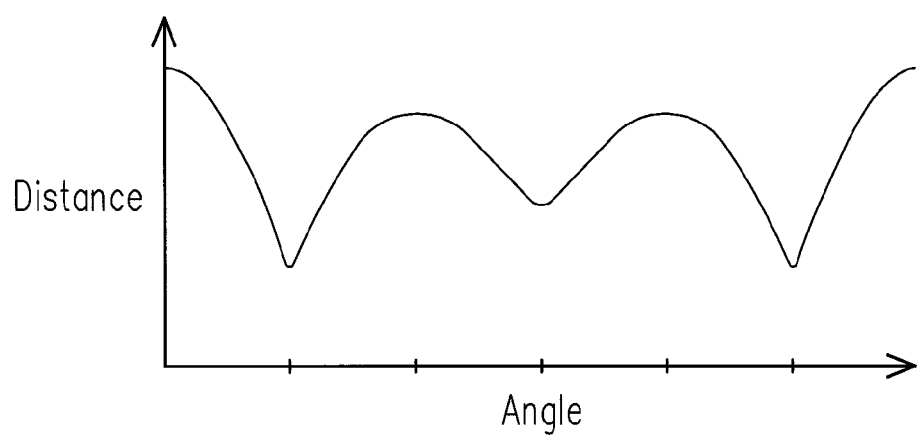

For instance, FIG. 6A and FIG. 6B illustrate an example of the method for polygon gesture detection and interaction according to an embodiment of the invention. Referring to FIG. 6A, the gesture receiving module 161 may receive a gesture of isosceles triangle inputted by the user to the input unit 14, and collect a plurality of sampling points in a trajectory 60 of the gesture. Next, a waveform diagram 62 as shown in FIG. 6B is drawn by using the same method as that described in the foregoing embodiment. Referring to FIG. 6B, a waveform diagram 62 shows a waveform including three complete peaks or troughs which are not in full symmetry, wherein peak values of two smaller peaks are substantially the same while a peak value of another peak is relatively greater. Accordingly, the determining module 165 may determine that a distance between a center $O_4$ and one of the vertices is greater than that of each of the other two vertices, and the center $O_4$ is closer to the other two vertices according the proportional relation (i.e., one larger and two small) of the sizes of the three peaks. Based on this characteristic, the determining module 165 may determine that the shape formed by the trajectory 60 of the gesture is an isosceles triangle. Accordingly, the determining module 165 may perform the specific function corresponding to the isosceles triangle gesture set in advance.

By using above-said method, the electronic apparatus 10 is capable of detecting the shape of the polygon gesture performed by the user, and interacting with said gesture to perform the specific function. Moreover, in another embodiment of the invention, the electronic apparatus 10 is capable of further determining a screen object that the user intends to operate, so as to perform the specific function on the object according to the shape of the gesture.

Figure 7:
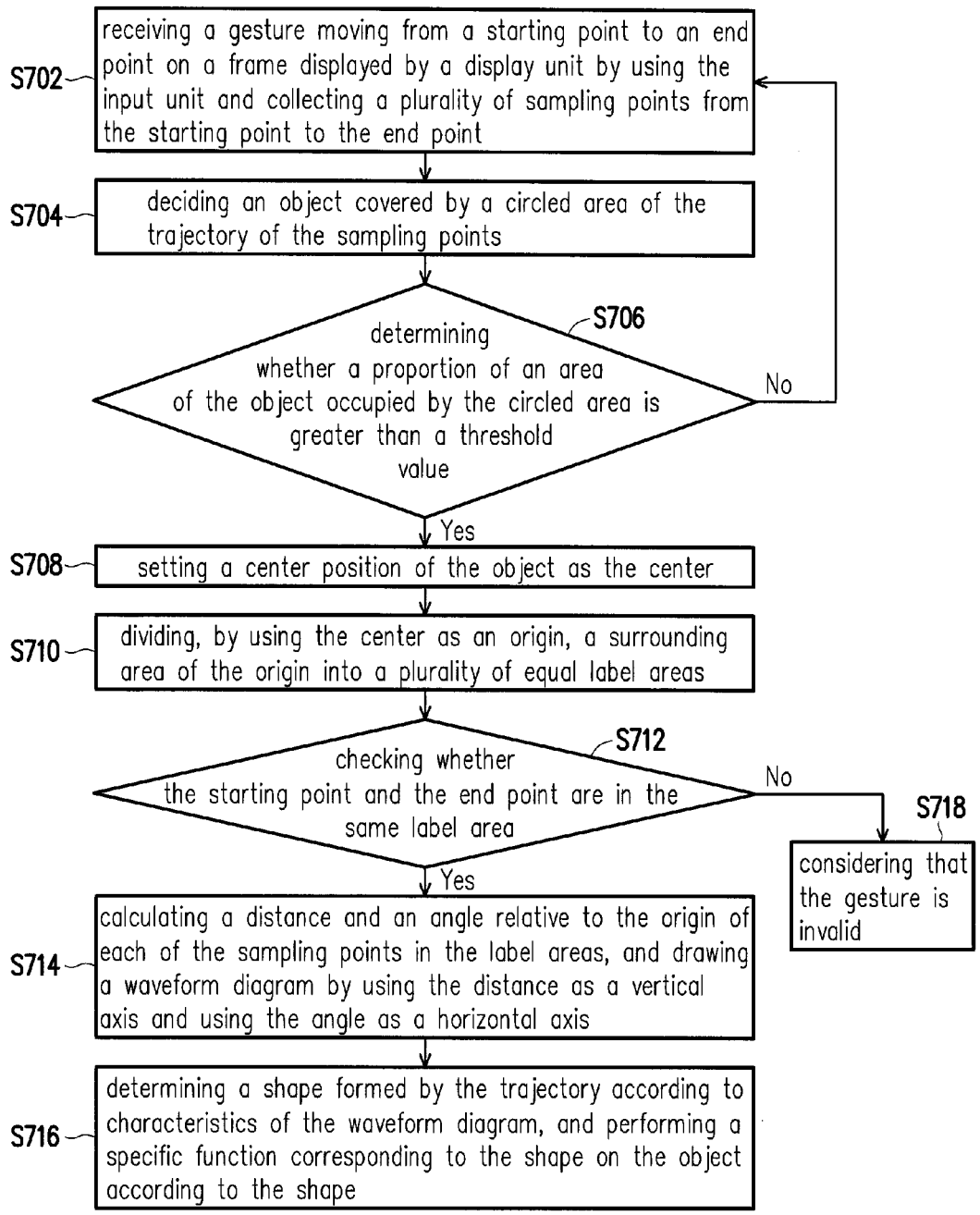
FIG. 7 is a flowchart illustrating a method for polygon gesture detection and interaction according to an embodiment of the invention.

More specifically, FIG. 7 is a flowchart illustrating a method for polygon gesture detection and interaction according to an embodiment of the invention. Referring to FIG. 1 and FIG. 7 together, a method for polygon gesture detection and interaction of the present embodiment is adapted to the electronic apparatus 10 further including a display unit (not illustrated). The display unit is, for example, a screen or a television adopting a liquid crystal display (LCD), a light-emitting diode (LED), a field emission display (FED) or other types of panels, and capable of receiving a display signal inputted from the outside to display a frame. The following steps are elaborated to describe the method for polygon gesture detection and interaction of the present embodiment with reference to each element of the electronic apparatus 10.

In step S702, the gesture receiving module 161 receives a gesture moving from a starting point to an end point by the input unit 14 and collects a plurality of sampling points from the starting point to the end point. Said step S702 is identical or similar to step S202 in the foregoing embodiment, thus detailed content thereof is omitted hereinafter.

Unlike the foregoing embodiment, in the present embodiment, the center obtaining module 162 first decides an object covered by a circled area of the trajectory of the sampling points on a frame of the display unit in step S704, and further determines whether a proportion of an area of the object occupied by the circled area is greater than a threshold in step S706. More specifically, the center obtaining module 162 may analyze which of the object on the display frame of the display unit is to be covered by an area circled by the trajectory of the gesture according to the received sampling point information so as to decide such object as the object that user intends to operate, and then confirm whether the user really intends to operate the object according to whether the area circled by the trajectory of the gesture occupies the object for a specific proportion. Therein, in case the center obtaining module 162 determines that the proportion is less than the threshold, the flow is returned to step S702 for receiving a next polygon gesture. In case the center obtaining module 162 determines that the proportion is greater than the threshold, the center obtaining module 162 may use a center position of the object as the center of the gesture in step S708.

Accordingly, in step S710, the area dividing module 163 may divide, by using the center as an origin, a surrounding area of the origin into a plurality of equal label areas to be used for determining the shape of the polygon formed by the gesture.

Next, in step S712, the gesture obtaining module 161 may check whether the starting point and the end point are in the same label area. When the starting point and the end point are not in the same label area, the gesture receiving module 161 may consider that the gesture is invalid in step S718. More specifically, the gesture receiving module 161 may confirm whether the shape of the polygon gesture is completely drawn by checking whether the starting point and the end point of the gesture are in the same label area. It indicates that the gesture is not completed when the starting point and the end point are not in the same label area, such that the gesture may be considered as invalid so as to avoid misjudgments.

When the starting point and the end point of the gesture are in the same label area, in step S714, the calculation module 164 may calculate a distance and an angle relative to the origin of each of the sampling points in the label areas, and draw a waveform diagram by using the distance as a vertical axis and using the angle as a horizontal axis. The waveform diagram may show variations of the distance and the angle of each of the sampling points of the gesture to be used for analyzing a shape formed by the gesture.

Lastly, in step S716, the determining module 165 may determine the shape formed by the trajectory according to a characteristic of the waveform diagram, and perform a specific function corresponding to the shape on the object circled by the gesture according to the shape. More specifically, the determining module 165 may determine the shape of the polygon formed by the trajectory of the gesture according to a number of peaks or troughs existed in the waveform diagram, or peak values of the peaks and a proportional relation between sizes of the peak values, and then perform the specific function (e.g., selecting the object, activating an application corresponding to the object, but the invention is not limited thereto) corresponding to the shape on the object circled by the gesture according to the shape.

The present invention further provides a computer readable medium used to store computer program to be loaded into an electronic apparatus for executing each step in the method for polygon gesture detection and interaction as aforementioned. Basically, the computer program is assembled by a plurality of program sections (i.e. building an organization diagram program section, approving a list program section, setting a program section, and deploying a program section). Moreover, after the program sections are loaded to the electronic apparatus for execution, the steps in the method for polygon gesture detection and interaction may then be completed.

Based on above, in the method, the apparatus, and the computer readable medium for polygon gesture detection and interaction of the invention, the center of the gesture may be obtained by analyzing the trajectory of the gesture, and the shape of the gesture may be determined according to the positional relation between the each sampling point of the gesture and the center, so as to achieve the purpose of the determining polygon gesture. Accordingly, the specific function set in advance may be performed on the electronic apparatus according to various shapes of the gesture, such that the diversity of interaction between the user and the apparatus may be improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for polygon gesture detection and interaction, adapted to an electronic apparatus having an input unit, and the method comprises:
   receiving a gesture moving from a starting point to an end point by using the input unit and collecting a plurality of sampling points from the starting point to the end point;
   analyzing a trajectory of the sampling points to obtain a center of the gesture;
   dividing, by using the center as an origin, a surrounding area of the origin into a plurality of equal label areas;
   calculating a distance and an angle relative to the origin of each of the sampling points in the label areas, and drawing a waveform diagram by using the distance as a vertical axis and using the angle as a horizontal axis; and
   determining a shape formed by the trajectory according to at least one characteristic of the waveform diagram, and performing a specific function corresponding to the shape.

2. The method for polygon gesture detection and interaction of claim 1, wherein the step of analyzing the trajectory of the sampling points to obtain the center of the gesture comprises:
   calculating a center of the trajectory to be used as the center of the gesture according to a coordinate of each of the sampling points.

3. The method for polygon gesture detection and interaction of claim 1, wherein the electronic apparatus further comprises a display unit, and the step of analyzing the trajectory of the sampling points to obtain the center of the gesture comprises:
   deciding an object covered by a circled area of the trajectory of the sampling points on a frame of the display unit;
   determining whether a proportion of an area of the object occupied by the circled area is greater than a threshold; and
   using a center position of the object as the center when the proportion is greater than the threshold.

4. The method for polygon gesture detection and interaction of claim 3, wherein the step of performing the specific function corresponding to the shape comprises:
   performing the specific function corresponding to the shape on the object according to the shape formed by the trajectory.

5. The method for polygon gesture detection and interaction of claim 1, wherein after the step of dividing, by using the center as the origin, the surrounding area of the origin into the equal label areas, the method further comprises:
   checking whether the starting point and the end point are in the same label area; and
   considering that the gesture is invalid when the starting point and the end point are not in the same label area.

6. The method for polygon gesture detection and interaction of claim 1, wherein the step of determining the shape formed by the trajectory according to the characteristic of the waveform diagram comprises:
   determining the shape formed by the trajectory according to a number of one or more peaks or troughs existed in the waveform diagram.

7. The method for polygon gesture detection and interaction of claim 1, wherein the step of determining the shape formed by the trajectory according to the characteristic of the waveform diagram comprises:
   determining the shape formed by the trajectory according to peak values of one or more peaks existed in the waveform diagram and a proportional relation between sizes of the peak values.

8. An apparatus for polygon gesture detection and interaction, comprising:
   an input unit, configured to receive a gesture;
   a storage unit, configured to record a plurality of modules; and
   one or more processing units, coupled to the input unit and the storage unit, configured to access and execute the modules recorded in the storage unit, and the modules comprising:
      a gesture receiving module, configured to receive a gesture moving from a starting point to an end point by using the input unit and collect a plurality of sampling points from the starting point to the end point;
      a center obtaining module, configured to analyze a trajectory of the sampling points to obtain a center of the gesture;
      an area dividing module, configured to divide, by using the center as an origin, a surrounding area of the origin into a plurality of equal label areas;
      a calculation module, configured to calculate a distance and an angle relative to the origin of each of the sampling points in the label areas, and draw a waveform diagram by using the distance as a vertical axis and using the angle as a horizontal axis to; and a determining module, configured to determine a shape formed by the trajectory according to at least one characteristic of the waveform diagram, and perform a specific function corresponding to the shape.

9. The apparatus for polygon gesture detection and interaction of claim 8, wherein the center obtaining module calculates a center of the trajectory to be used as the center of the gesture according to a coordinate of each of the sampling points.

10. The apparatus for polygon gesture detection and interaction of claim 8, further comprising a display unit, wherein the center obtaining module decides an object covered by a circled area of the trajectory of the sampling points on a frame of the display unit, determines whether a proportion of an area of the object occupied by the circled area is greater than a threshold, and uses a center position of the object as the center when the proportion is greater than the threshold.

11. The apparatus for polygon gesture detection and interaction of claim 10, wherein the determining module performs the specific function corresponding to the shape on the object according to the shape formed by the trajectory.

12. The apparatus for polygon gesture detection and interaction of claim 8, wherein the gesture receiving module further checks whether the starting point and the end point are in the same label area and considers that the gesture is invalid when the starting point and the end point are not in the same label area.

13. The apparatus for polygon gesture detection and interaction of claim 8, wherein the determining module determines the shape formed by the trajectory according to a number of one or more peaks or troughs existed in the waveform diagram.

14. The apparatus for polygon gesture detection and interaction of claim 8, wherein the determining module determines the shape formed by the trajectory according to peak values of one or more peaks existed in the waveform diagram and a proportional relation between sizes of the peak values.

15. A non-transitory computer readable medium, storing programs to be loaded into an electronic apparatus to perform steps of:

receiving a gesture moving from a starting point to an end point by an input unit of the electronic apparatus and collecting a plurality of sampling points from the starting point to the end point;

analyzing a trajectory of the sampling points to obtain a center of the gesture;

dividing, by using the center as an origin, a surrounding area of the origin into a plurality of equal label areas;

calculating a distance and an angle relative to the origin of each of the sampling points in the label areas, and drawing a waveform diagram by using the distance as a vertical axis and using the angle as a horizontal axis; and determining a shape formed by the trajectory according to at least one characteristic of the waveform diagram, and performing a specific function corresponding to the shape.

\* \* \* \* \*